US012377661B2

(12) United States Patent
Qiu et al.

(10) Patent No.: US 12,377,661 B2
(45) Date of Patent: Aug. 5, 2025

(54) INKJET PROCESSING SYSTEM FOR ARTIFICIAL STONES AND APPLICATION THEREOF

(71) Applicant: VEEGOO TECHNOLOGY CO., LTD., Foshan (CN)

(72) Inventors: Yeheng Qiu, Foshan (CN); Zhongyuan Li, Foshan (CN); Jianqing Deng, Foshan (CN)

(73) Assignee: VEEGOO TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 19/021,987

(22) Filed: Jan. 15, 2025

(65) Prior Publication Data

US 2025/0229543 A1 Jul. 17, 2025

Related U.S. Application Data

(63) Continuation of application No. PCT/CN2024/139980, filed on Dec. 17, 2024.

(30) Foreign Application Priority Data

May 30, 2024 (CN) ......................... 202410683035.3

(51) Int. Cl.
*B41J 3/407* (2006.01)
*B41J 11/00* (2006.01)
(Continued)

(52) U.S. Cl.
CPC ........... *B41J 3/4073* (2013.01); *B41J 11/002* (2013.01); *B41J 13/08* (2013.01); *B41J 13/22* (2013.01); *B41M 5/0088* (2013.01)

(58) Field of Classification Search
CPC ........ B41J 3/4073; B41J 11/002; B41J 13/08; B41J 13/22
See application file for complete search history.

(56) References Cited

U.S. PATENT DOCUMENTS

2010/0034572 A1* 2/2010 Chen ....................... B41F 15/00 400/624

FOREIGN PATENT DOCUMENTS

CN 203527633 U 4/2014
CN 104039559 A * 9/2014 .............. B05C 1/14
(Continued)

OTHER PUBLICATIONS

Wells, MachineTranslationofCN-104039559-A, 2014 (Year: 2014).*

*Primary Examiner* — Scott A Richmond

(57) ABSTRACT

An artificial stone inkjet processing system includes a centering device, an inkjet printing device, a drying device, a base frame, a lifting frame, first and second drive assemblies and a cooling device. The centering device, the inkjet printing device, the drying device and the cooling device are arranged sequentially along a conveying direction of the artificial stone. The inkjet printing device is configured to perform inkjet printing. The drying device includes a conveying assembly, a heating box and a placement mechanism. An inlet of a conveying end of the conveying assembly is adjacent to an outlet of a conveying end of the inkjet printing device. The first assembly is configured to drive the lifting frame to rise and descend relative to the base frame. The second drive assembly is arranged at the lifting frame, and its conveying end has a horizontal conveying function.

10 Claims, 12 Drawing Sheets

(51) Int. Cl.

| | |
|---|---|
| ***B41J 13/08*** | (2006.01) |
| ***B41J 13/22*** | (2006.01) |
| ***B41M 5/00*** | (2006.01) |

(56) References Cited

FOREIGN PATENT DOCUMENTS

| | | | |
|---|---|---|---|
| CN | 108480562 | A | 9/2018 |
| CN | 208247267 | U | 12/2018 |
| CN | 212448877 | U | 2/2021 |

* cited by examiner

INKJET PROCESSING SYSTEM FOR ARTIFICIAL STONES AND APPLICATION THEREOF

CROSS-REFERENCE TO RELATED APPLICATIONS

This application is a continuation of International Patent Application No. PCT/CN2024/139980, filed on Dec. 17, 2024, which claims the benefit of priority from Chinese Patent Application No. 202410683035.3, filed on May 30, 2024. The content of the aforementioned application, including any intervening amendments thereto, is incorporated herein by reference in its entirety.

TECHNICAL FIELD

This application relates to artificial stone processing, and more particularly to an inkjet processing system for artificial stones and an application thereof.

BACKGROUND

Artificial quartz stone is composed of more than 90% natural quartz and about 10% pigments, resins and other additives for bonding, curing and viscosity adjustment. It is processed into slabs through a production process involving vacuum treatment, high-frequency vibration molding and thermal curing (the curing temperature depends on the type of the used curing agent). The artificial quartz stone has a hard texture (Mohs hardness of 5-7) and a dense structure (density of 2.3 g/cm$^3$), offering superior wear resistance, pressure resistance, high-temperature resistance, corrosion resistance and impermeability compared to other decorative materials.

Inkjet printing is often adopted in the prior art to improve the appearance of the artificial quartz slabs. Different slabs require different types of ink, and different ink materials have different curing methods, for example, some ink materials can be cured at room temperature, while others require a high temperature. Therefore, when a production line involves the above two curing methods, a bottleneck where some slabs requiring thermal curing may block those that do not require such treatment, reducing the processing efficiency.

SUMMARY

An object of the disclosure is to provide an inkjet processing system for artificial stones, in which an artificial stone is centered and positioned by using a centering device, and then subjected to inkjet printing by using an inkjet printing device. Then, the artificial stone is dried in a heating box and conveyed to a placement mechanism through a conveying assembly within a transition station. The placement mechanism is configured to receive the artificial stone and output it to either the heating box or a cooling device.

The present disclosure further provides an application of the above inkjet processing system in the inkjet printing process of artificial stones.

Technical solutions of the present disclosure are described as follows.

An inkjet processing system for artificial stones, comprising:

a centering device;

an inkjet printing device;

a drying device; and a cooling device;

wherein the centering device, the inkjet printing device, the drying device and the cooling device are arranged sequentially in a conveying direction of the artificial stones;

the inkjet printing device is configured to perform inkjet printing; a first conveying end of the centering device is oriented toward the inkjet printing device, and a conveying direction of the first conveying end of the centering device is perpendicular to a conveying direction of a second conveying end of the centering device;

the drying device comprises a first conveying assembly, a heating box and a placement mechanism;

the heating box is provided with a transition station having two hollow ends; one of the two hollow ends of the transition station is oriented toward the inkjet printing device, and the other of the two hollow ends of the transition station is oriented toward the placement mechanism; a side of the heating box facing toward the placement mechanism is provided with a storage station; the first conveying assembly is provided at the transition station; an inlet of a conveying end of the first conveying assembly is provided adjacent to an outlet of a conveying end of the inkjet printing device;

the placement mechanism comprises a base frame, a lifting frame, a first drive assembly, a second drive assembly and a picking assembly;

the first drive assembly is provided at the base frame; an output end of the first drive assembly is connected to the lifting frame, and configured to drive the lifting frame to move up and down with respect to the base frame, so as to adjust the lifting frame to an outlet of the conveying end of the first conveying assembly, the storage station or an inlet of a conveying end of the cooling device; and the second drive assembly is provided at the lifting frame; a conveying end of the second drive assembly is configured for horizontal conveying in a direction toward the storage station; the picking assembly is provided with a mold picker configured for gripping a mold frame loaded with artificial stones; the mold picker is configured to move in a resettable manner; and the picking assembly is movably mounted on the lifting frame, and is configured to reciprocate between the storage station and the conveying end of the second drive assembly.

In some embodiments, the heating box comprises a box body, a heating air duct assembly and an air guide plate.

Compared to the prior art, the present disclosure has the following beneficial effects.

The inkjet processing system for artificial stones is provided, in which an artificial stone is centered and positioned by using the centering device, and then subjected to inkjet printing by using the inkjet printing device. Then, the artificial stone is dried in the heating box and conveyed to the placement mechanism through the first conveying assembly within the transition station. The placement mechanism is configured to receive the artificial stone and output it to either the heating box or the cooling device. The placement mechanism provided herein can flexibly choose between drying and direct cooling after inkjet printing on the artificial stone, thereby preventing processing system blockage caused by the drying requirement of some artificial stones after inkjet printing.

DETAILED DESCRIPTION OF EMBODIMENTS

Figure 1:
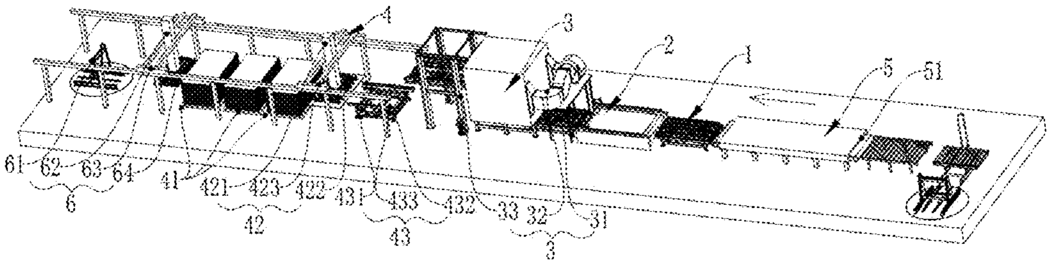
FIG. 1 is a structural diagram of an inkjet processing system for artificial stones according to an embodiment of the present disclosure.
Figure 2:
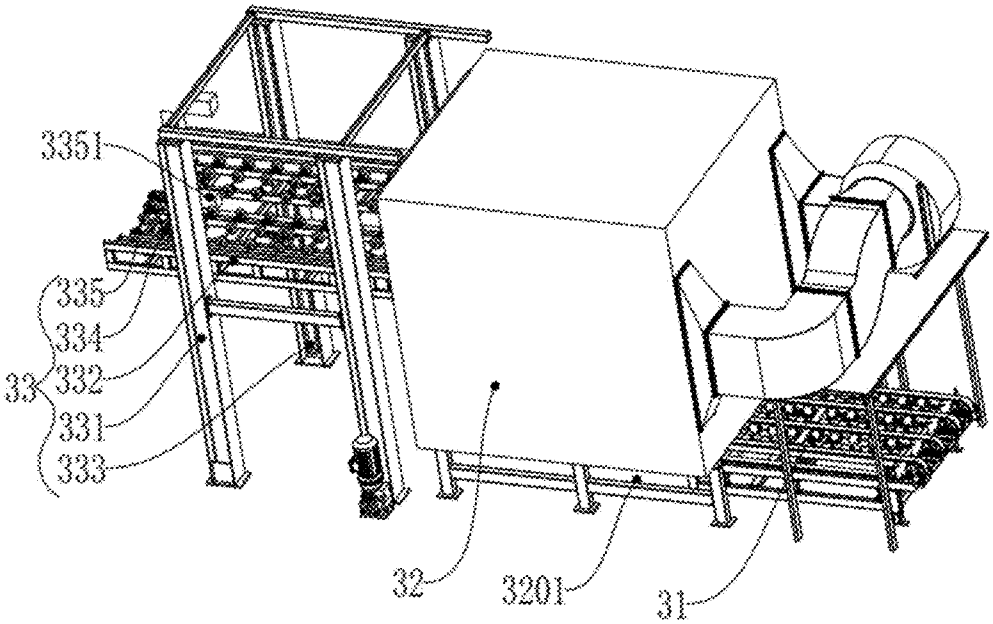
FIG. 2 is a structural diagram 1 of a drying device according to an embodiment of the present disclosure.
Figure 3:
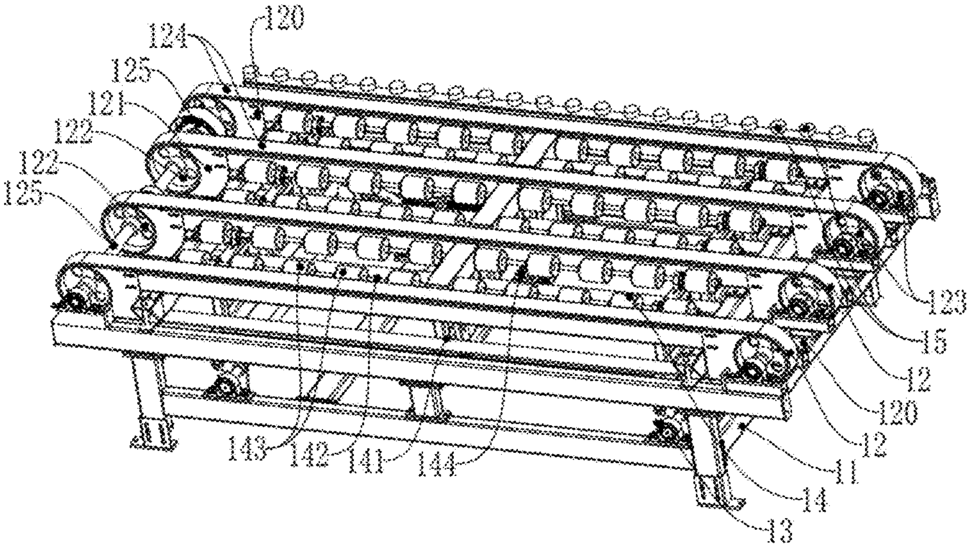
FIG. 3 is a structural diagram of a centering device according to an embodiment of the present disclosure.
Figure 4:
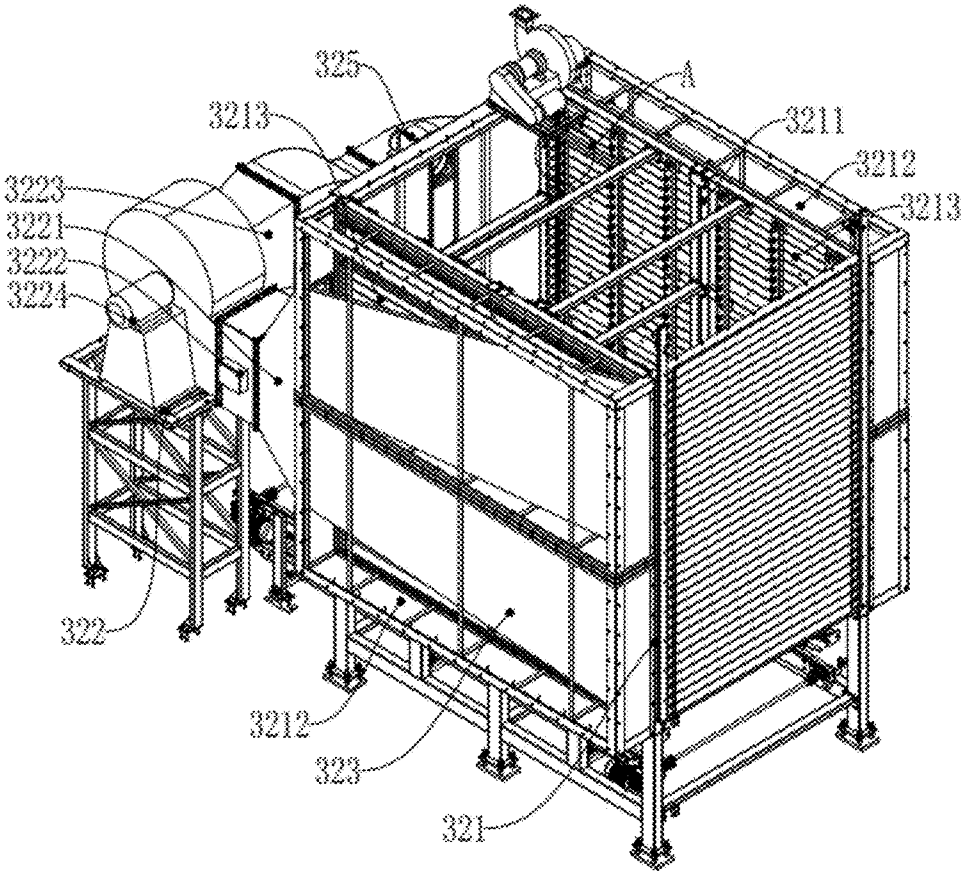
FIG. 4 is a structural diagram 2 of the drying device according to an embodiment of the present disclosure.
Figure 5:
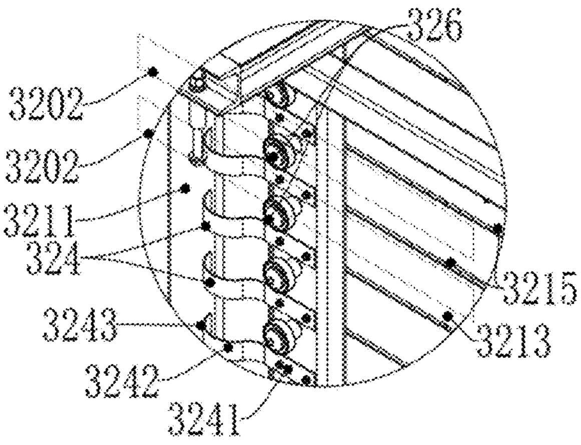
FIG. 5 is an enlarged view of portion "A" shown in FIG. 4.

The embodiments of the present disclosure are described in detail below. The exemplary embodiments are illustrated in the accompanying drawings, in which like or similar reference numerals indicate like or similar elements or elements having like or similar functions throughout the drawings. The embodiments described with reference to the accompanying drawings are merely exemplary and illustrative, and are not intended to limit the disclosure.

As shown in FIGS. 1-11, an embodiment of the present disclosure provides an inkjet processing system for artificial stones, including a centering device 1, an inkjet printing device 2, a drying device 3 and a cooling device 4. The centering device 1, the inkjet printing device 2, the drying device 3 and the cooling device 4 are arranged sequentially in a conveying direction of the artificial stones. The inkjet printing device 2 is configured to perform inkjet printing. A first conveying end of the centering device 1 is oriented toward the inkjet printing device 2, and a conveying direction of the first conveying end of the centering device 1 is perpendicular to a conveying direction of a second conveying end of the centering device 1. The drying device 3 includes a first conveying assembly 31, a heating box 32 and a placement mechanism 33. The heating box 32 is provided with a transition station 3201 having two hollow ends. One of the two hollow ends of the transition station 3201 is oriented toward the inkjet printing device 2, and the other of the two hollow ends of the transition station 3201 is oriented toward the placement mechanism 33. A side of the heating box 32 facing toward the placement mechanism 33 is provided with a storage station 3202. The first conveying assembly 31 is provided at the transition station 3201. An inlet of a conveying end of the first conveying assembly 31 is provided adjacent to an outlet of a conveying end of the inkjet printing device 2. The placement mechanism 33 includes a base frame 331, a lifting frame 332, a first drive assembly 333, a second drive assembly 334 and a picking assembly 335. The first drive assembly 333 is provided at the base frame 331. An output end of the first drive assembly 333 is connected to the lifting frame 332, and configured to drive the lifting frame 332 to move up and down with respect to the base frame 331, so as to adjust the lifting frame 332 to an outlet of the conveying end of the first conveying assembly 31, the storage station 3202 or an inlet of a conveying end of the cooling device 4. The second drive assembly 334 is provided at the lifting frame 332. A conveying end of the second drive assembly 334 is configured for horizontal conveying in a direction toward the storage station 3202. The picking assembly 335 is provided with a mold picker 3351 configured for gripping a mold frame loaded with artificial stones. The mold picker 3351 is configured to move in a resettable manner. And the picking assembly 335 is movably mounted on the lifting frame 332, and is configured to reciprocate between the storage station 3202 and the conveying end of the second drive assembly 334.

The inkjet processing system for artificial stones is provided, in which an artificial stone is centered and positioned by using the centering device 1, then subjected to inkjet printing by using the inkjet printing device 2. Then, the artificial stone is dried in the heating box 32 and conveyed to the placement mechanism 33 through the first conveying assembly 31 within the transition station 3201. The placement mechanism 33 is configured to receive the artificial stone and output it to either the heating box 32 or the cooling device 4. The placement mechanism 33 provided herein can flexibly choose between drying and direct cooling after inkjet printing on the artificial stone, thereby preventing processing system blockage caused by the drying requirement of some artificial stones after inkjet printing.

In the present disclosure, the artificial stone can be directly conveyed in the inkjet processing system provided herein or transported using a tray. As shown in FIG. 1, the arrow indicates a conveying direction of the artificial stone. The artificial stone is transported to the centering device 1. The centering device 1 has conveying ends in two directions. The first conveying end of the centering device 1 is oriented toward the inkjet printing device 2, and is configured to output the artificial stone to the inkjet printing device 2. The second conveying end of the centering device 1 is perpendicular to the conveying direction of the artificial stone. The second conveying end of the centering device 1 is configured to perform centering processing on the artificial stone, such that the artificial stone enters the inkjet printing device 2 in an optimal position. Based on the centered position, the artificial stone sequentially passes through the first conveying assembly 31 and the placement mechanism 33. Subsequently, the placement mechanism 33 is configured to place the artificial stone into the heating box 32 or the cooling device 4. Specifically, the heating box 32 is provided with the transition station 3201 having two hollow ends. One of the two hollow ends of the transition station 3201 is communicated with the inkjet printing device 2, such that the first conveying assembly 31 can receive the artificial stone at the first end of the transition station 3201. A conveying end of the placement mechanism 33 is configured to vertically move through the other of the two hollow ends of the transition station 3201 after being height-adjusted, so as to receive the artificial stone conveyed by the first conveying assembly 31. After receiving the artificial stone, the placement mechanism 33 can output the artificial stone to the heating box 32 for drying as required for processing. Alternatively, the artificial stone can be directly output to the cooling device 4 for cooling or first dried in the heating box 32 and then output to the cooling device 4 for cooling. Specifically, when the artificial stone needs to be stored, the first drive assembly 333 is is activated to drive the lifting frame 332 to move to a height position for receiving the artificial stone. Then, the artificial stone is placed at a center of the lifting frame 332 manually or by using the second drive assembly 334. Subsequently, the first drive assembly 333 is activated again to drive the lifting frame 332 to move to an unoccupied storage station 3202. Subsequently, the second drive assembly 334 is activated to convey the artificial stone forwardly toward the storage station 3202, thereby placing the artificial stone within the storage station 3202. When the artificial stone needs to be removed, the first drive assembly 333 is configured to drive the lifting frame 332 to move to a height position of the desired artificial stone. The picking assembly 335 is activated to move horizontally to the position of the artificial stone, and the mold picker 3351 with a gripping function is configured to grasp the artificial stone. The artificial stone is transferred to the conveying end of the second drive assembly 334 on the lifting frame 332 under the returning action of the picking assembly 335. Then, the artificial stone is driven to be output under the reverse conveying action of the second drive assembly 334, thereby achieving the removal of the artificial stone from the box body 321.

Thus, after completing inkjet printing, the artificial stone can undergo either a drying or cooling process. If drying is required, the placement mechanism 33 is merely required to convey the artificial stone in a reverse direction to the storage station 3202 of the heating box 32. Since the placement mechanism 33 moves in a direction away from the heating box 32 when conveying forward, the drying process does not interfere with other artificial stones entering the cooling device 4. Such an arrangement effectively prevents blockages in the processing system during the drying process and enables flexible utilization of both the heating box 32 and the cooling device 4. As a result, the drying device 3 and the cooling device 4 function without mutual interference, thereby improving the processing efficiency of inkjet processing system for artificial stones.

Specifically, the conveying ends of the inkjet printing device 2, the centering device 1, the first conveying assembly 31 and the placement mechanism 33 refer to the main mechanisms that achieve linear movement. These conveying ends can be implemented using well-known mechanisms capable of driving linear movement, such as a conveyor belt structure, a conveying roller structure, a gear-and-chain combination, a moving cart, a pneumatic cylinder, a hydraulic cylinder, a robotic arm or a motor-and-lead screw assembly. An inlet of the conveying end refers to a position where the artificial stone enters the conveying end, while an outlet of the conveying end refers to a position where the artificial stone outputs from the conveying end.

Specifically, the first drive assembly 333 can be replaced by any well-known mechanism capable of driving vertical movement, such as the pneumatic cylinder, the hydraulic cylinder, the motor-and-lead screw assembly or the robotic arm, as long as it enables the lifting frame 332 to move vertically with respect to the base frame 331. The second drive assembly 334 can be replaced by any well-known mechanism capable of driving horizontal movement, such as the pneumatic cylinder, the hydraulic cylinder, the moving cart, the conveying roller structure or the conveyor belt structure, as long as it enables the artificial stone to move horizontally on the lifting frame 332. The picking assembly 335 may also move horizontally on the lifting frame 332 through any well-known mechanism capable of driving horizontal movement, such as the pneumatic cylinder, the hydraulic cylinder, the moving cart, the conveying roller structure or the conveyor belt structure, as long as it enables the picking assembly 335 to move horizontally on the lifting frame 332. The mold picker 3351 may be replaced by any well-known mechanism with the gripping function, such as a clamp, a gripping hand or the robotic arm.

In some embodiments, the heating box 32 includes a box body 321, a heating air duct assembly 322 and an air guide plate 323. The box body 321 is provided with a drying storage chamber 3211 and an air-inlet chamber 3212. A partition plate 3213 is provided between the drying storage chamber 3211 and the air-inlet chamber 3212 to separated the drying storage chamber 3211 from the air-inlet chamber 3212. The heating air duct assembly 322 includes a heating air-inlet duct 3221 and an air heating component 3222. An output end of the heating air-inlet duct 3221 is communicated with a first end of the air-inlet chamber 3212 in a length direction of the air-inlet chamber 3212. An output end of the air-inlet chamber 3212 is located at the partition plate 3213. The air-inlet chamber 3212 has a plurality of output ends, and the plurality of output ends of the air-inlet chambers 3212 are configured to extend in a length direction of the partition plate 3213, and are communicated with the drying storage chamber 3211. The air heating component 3222 is provided at the heating air-inlet duct 3221 for heating. The air guide plate 323 is provided in the air-inlet chamber 3212. A first end of the air guide plate 323 is located at the first end of the air-inlet chamber 3212 in the length direction of the air-inlet chamber 3212, and a second end of the air guide plate 323 is located at a second end of the air-inlet chamber 3212 in the length direction of the air-inlet chamber 3212. An air guide passage 3214 is formed between the partition plate 3213 and the air guide plate 323. And an inner diameter of the air guide passage 3214 is configured to be reduced in a direction away from the heating air-inlet duct 3221.

The heating box 32 provided herein is provided with the air guide plate 323 in the air-inlet chamber 3212 communicated with the drying storage chamber 3211. The air guide plate 323 is configured to adjust an inner diameter of the air-inlet chamber 3212 to gradually reduce the inner diameter of the air guide passage 3214, so as to alter an airflow velocity in the length direction of the air-inlet chamber 3212 and progressively increase an airflow speed. As a result, the air enters the drying storage chamber 3211 in the length direction of the partition plate 3213 in a nearly synchronous manner, thereby making the drying process in the drying storage chamber 3211 more uniform and solving the issue of uneven drying in the existing drying heating boxes caused by air entering from only one side.

Figure 6:
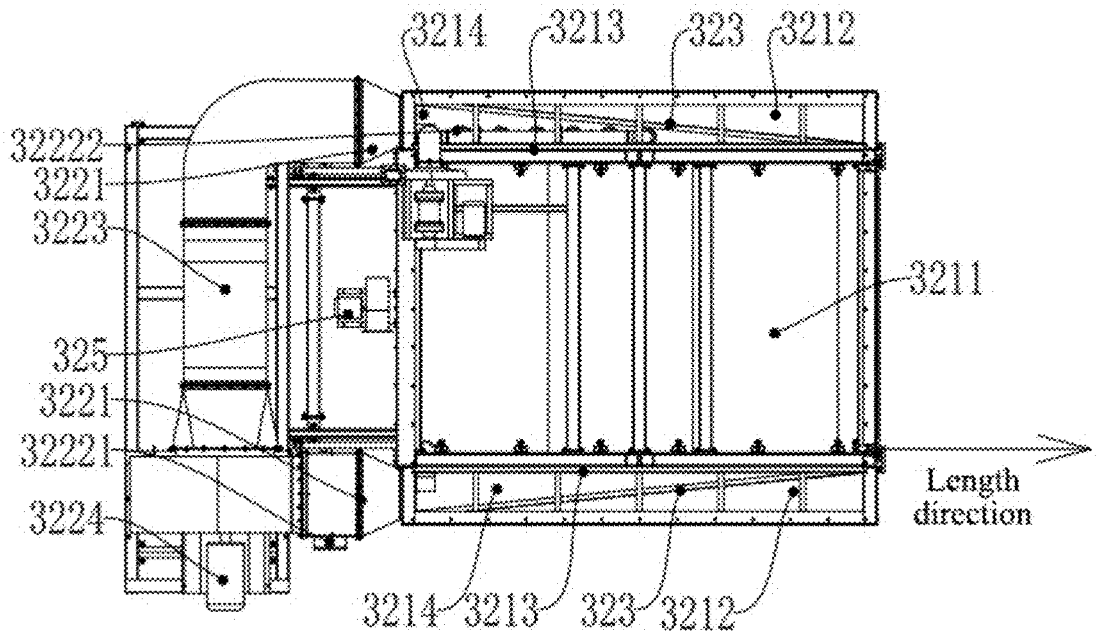
FIG. 6 is a top view of the drying device according to an embodiment of the present disclosure.
Figure 7:
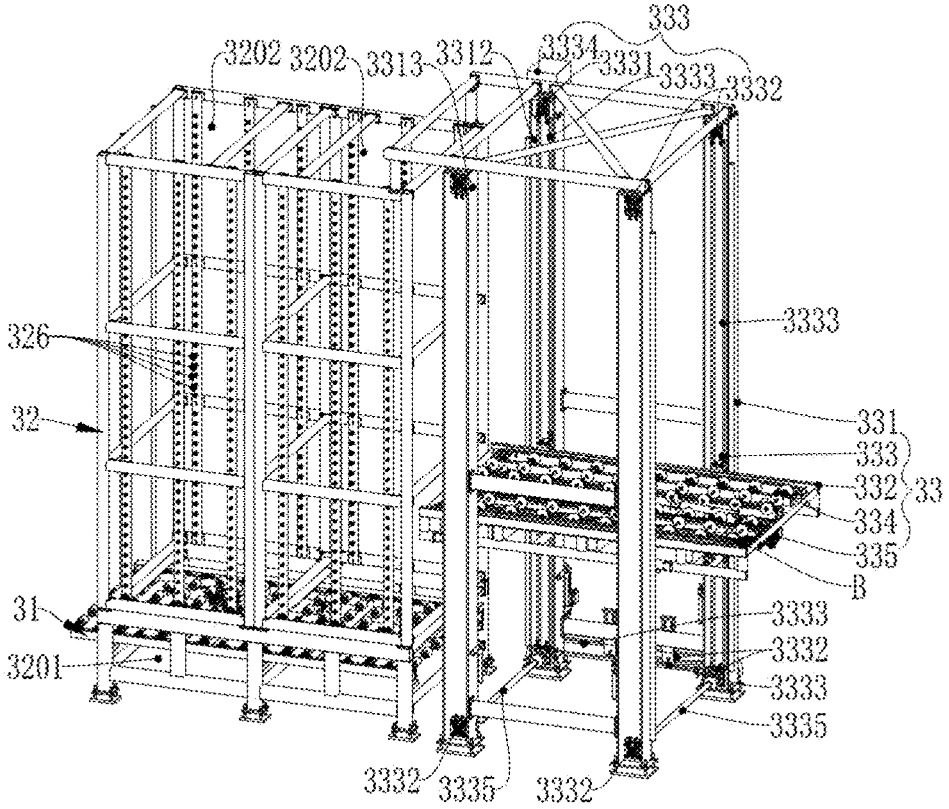
FIG. 7 is a structural diagram of a heating box according to an embodiment of the present disclosure.
Figure 8:
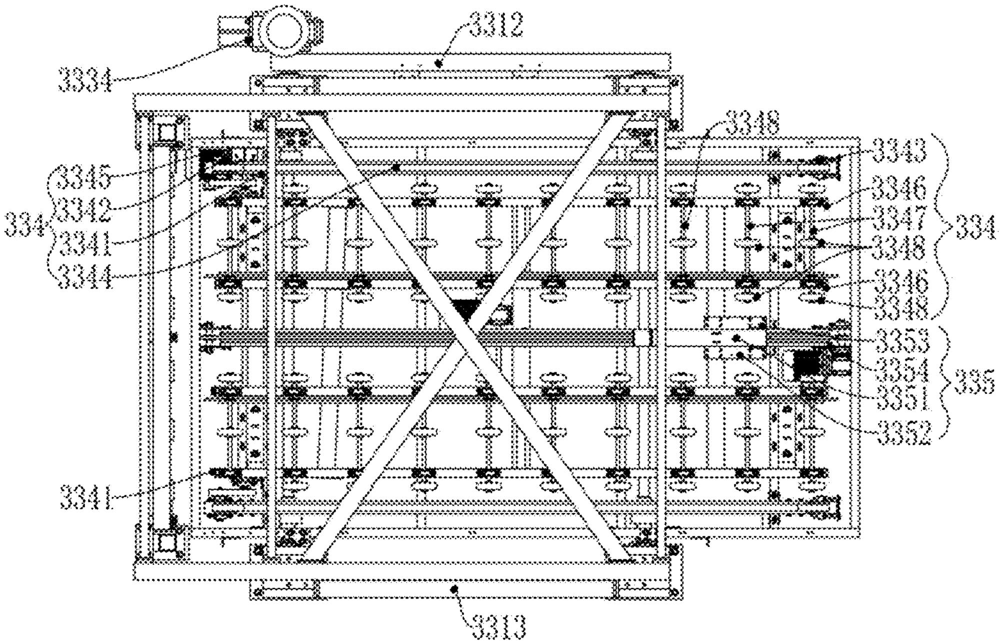
FIG. 8 is a top view of the drying device according to an embodiment of the present disclosure.
Figure 9:
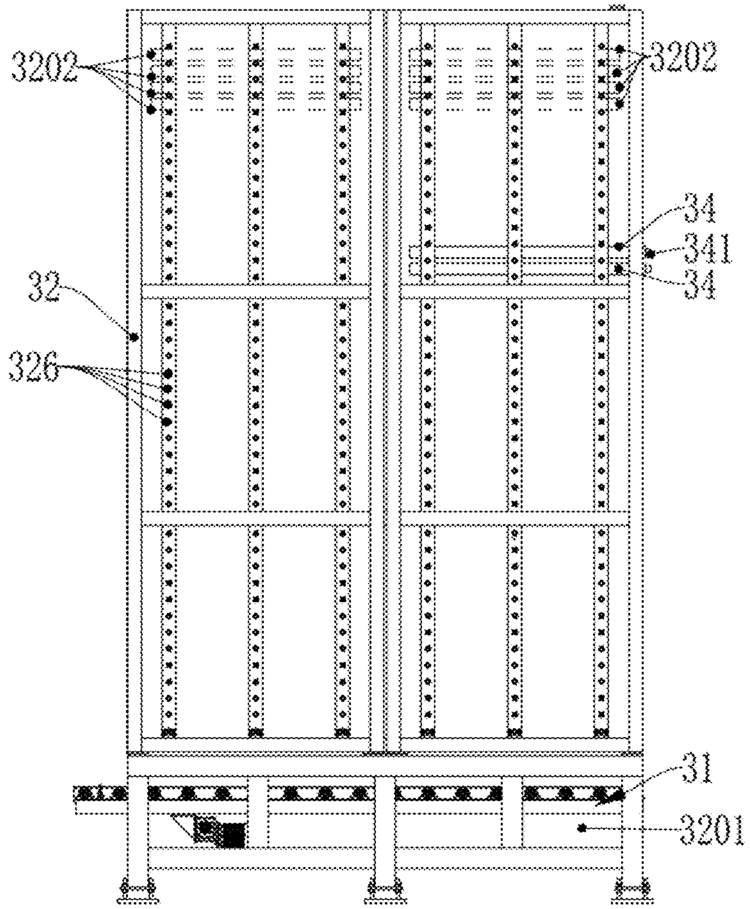
FIG. 9 is a side view of the heating box according to an embodiment of the present disclosure.
Figure 10:
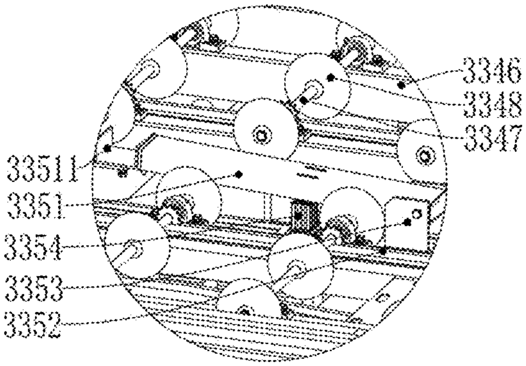
FIG. 10 is an enlarged view of portion "B" shown in FIG. 7.

Specifically, the box body 321 is provided with the drying storage chamber 3211 and the air-inlet chamber 3212. The drying storage chamber 3211 is configured as a primary drying area and may be provided with a structure such as a bracket, the tray or a support wheel for supporting a to-be-dried object. As shown in FIG. 6, The air-inlet chamber 3212 is configured to output a heated gas to the drying storage chamber 3211. The first end of the air-inlet chamber 3212 in the length direction of the air-inlet chamber 3212 is communicated with the heating air-inlet duct 3221 configured to discharge gas into the air-inlet chamber 3212. After passing through the air heating component 3222, the gas is heated and then discharged into the air-inlet chamber 3212. The air-inlet chamber 3212 is further provided with the air guide plate 323 configured to extend obliquely in the length direction of the air-inlet chamber 3212. That is, the first end of the air guide plate 323 is located at the first end of the air-inlet chamber 3212 in the length direction of the air-inlet chamber 3212, and the second end of the air guide plate 323 is located at the second end of the air-inlet chamber 3212 in the length direction of the air-inlet chamber 3212. The air guide plate 323 provided in the air-inlet chamber 3212 is configured to adjust the inner diameter of the air-inlet chamber 3212. The air guide passage 3214 is formed between the air guide plate 323 and the partition plate 3213, and the inner diameter of the air guide passage 3214 is configured to be reduced in the direction away from the heating air-inlet duct 3221. Since the air guide passage 3214 is communicated with the heating air-inlet duct 3221, the heating air-inlet duct 3221 is configured to discharge the heated gas into the air guide passage 3214. Based on a constant airflow rate, the inner diameter of the air guide passage 3214 is configured to be reduced in the direction away from the heating air-inlet duct 3221, causing the airflow velocity to progressively increase along the length of the air-inlet chamber 3212. As a result, the airflow rapidly passes through the plurality of output ends of the air-inlet chambers 3212 located at the partition plate 3213 and is subsequently discharged into the drying storage chamber 3211. This configuration enables the airflow to be discharged into the drying storage chamber 3211 in a nearly synchronous manner along the length of the partition plate 3213, ensuring that the airflow is distributed to multiple locations in the drying storage chamber 3211 rather than being concentrated in a localized region. Consequently, the heating uniformity of the airflow is further improved, thereby addressing the issue of uneven drying in the conventional drying heating boxes caused by air entering the box interior from a single side.

The air heating component 3222 is a well-known mechanism with a heating function, such as a resistance wire heating structure, an electromagnetic heating structure or a water bath heating structure. The output end of the air-inlet chamber 3212 is a structure configured to discharge gas, such as a through hole, a slot or a nozzle.

In some embodiments, at least two sides of the drying storage chamber 3211 are each provided with the air-inlet chambers 3212, and the air-inlet chamber 3212 is communicated with the heating air-inlet duct 3221. The air heating component 3222 includes a resistance heating unit 32221 and a gas-fired heating unit 32222. The number of the air-inlet chambers 3212 is two. The number of the heating air-inlet duct 3221 is two. Two air-inlet chambers 3212 are in one-to-one correspondence with two heating air-inlet ducts 3221. One of the two heating air-inlet ducts 3221 is provided with the resistance heating unit 32221, and the other of the two heating air-inlet ducts 3221 is provided with the gas-fired heating unit 32222.

In this embodiment, a plurality of sides of the drying storage chamber 3211 are each provided with the air-inlet chamber 3212, and each air-inlet chamber 3212 is correspondingly communicated with the heating air-inlet duct 3221. When heated gas enters from the plurality of sides of the drying storage chamber 3211, the air guide passage 3214 provided in the air-inlet chamber 3212 enables the heated gas to enter the drying storage chamber 3211 from the plurality of sides in a nearly simultaneous manner in the length direction of the air-inlet chamber 3212, thereby further improving the drying uniformity of the drying storage chamber 3211.

The air heating component 3222 can be classified into the resistance heating unit 32221 and the gas-fired heating unit 32222 as required. The resistance heating unit 32221 is configured to generate heat by passing an electric current through a conductive material, thereby heating the gas introduced into the heating air-inlet duct 3221 with a high heating stability. The gas-fired heating unit 32222 is configured to heat the gas using a combustible gas, providing a high thermal output and being suitable for high-degree and fast-drying processes.

The heating air duct assembly 322 includes an air-suction duct 3223 and an air-extraction component 3224. A first output end of the air-suction duct 3223 is communicated with the heating air-inlet duct 3221 where the resistance heating unit 32221 is located, and a second output end of the air-suction duct 3223 is communicated with the heating air-inlet duct 3221 where the gas-fired heating unit 32222 is located. The air-suction duct 3223 is provided with the air-extraction component 3224.

In this embodiment, a single air-suction duct 3223 is preferably used to simultaneously supply airflow to the two heating air-inlet ducts 3221, i.e., the two heating air inlet ducts 3221 share one air-extraction component 3224. One of the output ends of the air-suction duct 3223 can be selectively opened as needed, such that air is drawn into the air-suction duct 3223 under the negative pressure of the air-extraction component 3224 and transferred to the corresponding heating air-inlet duct 3221, and then output to the air guide passage 3214. Such a configuration simplifies the number and structure of the heating air-inlet duct 3221.

The heating box 32 further includes an elastic buffer part 324. The elastic buffer part 324 is provided with a buffer fixing portion 3241 and a buffer elastic portion 3242. The buffer fixing portion 3241 is mounted in the drying storage chamber 3211. The buffer elastic portion 3242 is arranged in a suspended manner and has elasticity, and is provided with a buffer arc-shaped surface 3243.

When an object is placed in the drying storage chamber 3211, the elastic buffer part 324 is configured to provide a buffering effect as the object moves into the drying storage chamber 3211. An end point of the object's movement in the drying storage chamber 3211 is configured to abut against the elastic buffer part 324. The elastic buffer part 324 is provided with the buffer fixing portion 3241 and the buffer elastic portion 3242. The buffer fixing portion 3241 is configured to fix the elastic buffer part 324 in a predetermined position within the drying storage chamber 3211. The buffer elastic portion 3242 is arranged in the suspended manner. The elastic buffer part 324 has elasticity and can be made of materials such as metal, plastic or rubber, which have a certain degree of elasticity. Since the buffer elastic portion 3242 is arranged in the suspended manner, when an object moves to abut against the buffer elastic portion 3242, the buffer elastic portion 3242 undergoes elastic deformation. Through such deformation, the speed at which the object enters the drying storage chamber 3211 is reduced, thereby preventing the object from moving too rapidly and impacting the interior of the drying storage chamber 3211.

The drying storage chamber 3211 is provided with a plurality of storage stations 3202 in a height direction of the drying storage chamber 3211. Each of the storage stations 3202 is provided with the elastic buffer part 324. Through the arrangement of the storage stations 3202 in the height direction of the drying storage chamber 3211, objects can be arranged accordingly. As a result, the airflow output from the air-inlet chamber 3212 can be discharged in a length direction of the storage station 3202, thereby ensuring uniform heating across all of the storage stations 3202.

The output end of the air-inlet chamber 3212 is provided with a drying air-outlet 3215. The drying air-outlet 3215 is distributed in the length direction and a height direction of the partition plate 3213 and correspondingly communicated with the storage station 3202.

The output end of the air-inlet chamber 3212 is provided with the partition plate 3213, which is provided with a plurality of drying air-outlets 3215. The plurality of drying air-outlets 3215 are distributed in the height direction of the air-inlet partition 3213, allowing each drying air-outlet 3215 to correspond to a storage station 3202, thereby delivering air to different storage stations 3202. When the air-inlet chamber 3212 receives an input of gas, the gas is accelerated and discharged through the drying air-outlets 3215 distributed in the length direction of the partition plate 3213 to different positions of the storage stations 3202. As a result, each storage station 3202 is exposed to the gas almost simultaneously in the length direction of the storage station 3202, thereby improving the uniformity of heating for each storage station 3202.

The heating box 32 is further includes a dehumidifying device 325. The dehumidifying device 325 is communicated with the drying storage chamber 3211.

In this embodiment, in addition to heating the drying storage chamber 3211 through the heating air duct assembly 322, it is preferable to first use the dehumidifying device 325 to extract the air from the drying storage chamber 3211. After the humidity in the drying storage chamber 3211 reaches a specified value, the heating air duct assembly 322 is activated, thereby significantly improving the drying effect.

The drying storage chamber 3211 is provided with a storage roller 326. The storage roller 326 is arranged in the height direction of the drying storage chamber 3211. The storage station 3202 is formed between two vertically adjacent storage rollers 326. The storage roller 326 is mounted in the drying storage chamber 3211, and the storage station 3202 is formed between two vertically storage rollers 326, thereby forming separate storage stations 3202. At the same time, the storage roller 326 is configured to contact a bottom of the object to provide a rolling effect when the object enters or exits the storage station 3202, thereby improving the smoothness of the object's movement into and out of the storage station 3202.

In some embodiments, the inkjet processing system provided herein further includes a pretreatment device 5. The pretreatment device 5, the centering device 1, the inkjet printing device 2, the drying device 3 and the cooling device 4 are arranged sequentially in the conveying direction of the artificial stones. The pretreatment device 5 is provided with a pretreatment chamber 51. And the pretreatment chamber 51 is provided with a pre-heating mechanism and a cleaning mechanism.

The pretreatment chamber 51 is provided with the pre-heating mechanism, which is configured to heat the artificial stone, thereby ensuring the artificial stone reaches a certain temperature. This prevents the artificial stone from affecting the physicochemical properties of the ink due to a low temperature when later entering the inkjet printing device 2, ensuring that the ink is printed at the optimal temperature. The cleaning mechanism is configured for cleaning a surface of the artificial stone, so as to maintain a certain level of cleanliness and prevent the ink from adhering to impurities. For example, the cleaning mechanism can remove dust from the surface of the artificial stone under negative pressure. Both the pre-heating mechanism and the cleaning mechanism can be arranged within the pretreatment chamber 51 as needed.

In some embodiments, the centering device 1 includes a centering base 11, a second conveying assembly 12, a lifting assembly 13 and a third drive assembly 14. The second conveying assembly 12 is provided on the centering base 11. A conveying end of the second conveying assembly 12 is configured for conveying in a direction toward the inkjet printing device 2. The second conveying assembly 12 is provided in plurality. Conveying ends of any two adjacent second conveying assemblies 12 are configured to be spaced apart from each other to form a gap 120. The lifting assembly 13 and the third drive assembly 14 are provided within the gap 120. A conveying end of the lifting assembly 13 is connected to the third drive assembly 14. The lifting assembly is configured to drive the third drive assembly 14 to ascend to a position above or below the conveying end of the second conveying assembly 12. A conveying end of the third drive assembly 14 is configured to extend laterally, and is perpendicular to the conveying end of the second conveying assembly 12. The centering base 11 is provided with a positioning part 15. And the positioning part 15 is arranged at an outlet of the conveying end of the third drive assembly 14.

The conveying end of the second conveying assembly 12 is configured to convey the artificial stone toward the inkjet printing device 2. The second conveying assembly 12 can be provided with a plurality of identical conveying ends, and the gaps 120 are formed between the plurality of identical conveying ends. The lifting assembly 13 and the third drive assembly 14 are provided within the gaps 120 between the plurality of conveying ends of the second conveying assembly 12. In an initial state, the lifting assembly 13 and the third drive assembly 14 are located within the gap 120, allowing the artificial stone to be normally conveyed at the conveying end of the second conveying assembly 12. When centering is required, the lifting assembly 13 is activated to drive the third drive assembly 14 upward, causing the third drive assembly 14 to extend above the conveying end of the second conveying assembly 12, such that the conveying end of the third drive assembly 14 can lift the artificial stone. The third drive assembly 14 is then activated. The conveying end of the third drive assembly 14 is configured to drive the artificial stone to move toward an endpoint of the conveying end of the third drive assembly 14. At this endpoint, the artificial stone comes into contact with the positioning part 15 of the centering base 11, thereby positioning the artificial stone and achieving centering. Subsequently, the lifting assembly 13 is configured to drive the third drive assembly 14 downward to reset, and the artificial stone is placed back onto the conveying end of the second conveying assembly 12.

The second conveying assembly 12, the lifting assembly 13 and the third drive assembly 14 can be replaced with a well-known mechanism having a function of driving linear movement, as long as it can achieve the linear movement of the artificial stone.

In some embodiments, the second conveying assembly 12 includes a wheel seat 121, a first driving wheel 122, a first driven wheel 123, a conveyor belt 124 and a first driver 125.

The wheel seat 121 is mounted on the centering base 11. The gap 120 is formed between two wheel seats 121. The first driving wheel 122 and the first driven wheel 123 are rotatably mounted on the wheel seat 121. The first driving wheel 122 is synchronously rotatably connected to the first driven wheel 123 through the conveyor belt 124. An output end of the first driver 125 is connected to the first driving wheel 122. The first driver 125 is configured to drive the first driving wheel 122 to rotate, so as to drive the conveyor belt 124 to rotate.

The third drive assembly 14 includes a first drive seat 141, a drive shaft 142, a drive wheel 143 and a second driver 144.

The first drive seat 141 is mounted in the gap 120. An output end of the lifting assembly 13 is connected to the first drive seat 141. The lifting assembly 13 is configured to drive the first drive seat 141 to move up and down. The drive shaft 142 is rotatably mounted on the first drive seat 141. A plurality of drive wheels 143 are mounted on the drive shaft 142. An output end of the second driver 144 is connected to the drive shaft 142. The second driver 144 is configured to drive the drive shaft 142 to rotate, thereby driving the plurality of the drive wheels 143 to rotate.

In this embodiment, the conveyor belt 124 is preferably used to drive the artificial stone for conveyance. Specifically, a plurality of wheel seats 121 are arranged with gaps on the centering base 11. The first driving wheel 122 and the first driven wheel 123 are mounted on the wheel seat 121, respectively. The first driving wheel 122 is synchronously rotatably connected to the first driven wheel 123 through the conveyor belt 124. When the first driver 125 is activated, the output end of the first driver 125 is configured to drive the first driving wheel 122 to rotate. And under the synchronous action of the conveyor belt 124, the first driven wheel 123 rotates, which ultimately causes the conveyor belt 124 to rotate. As a result, the artificial stone on the conveyor belt 124 moves toward the inkjet printing device 2.

The first driver 125 is a well-known mechanism with a driving-rotation function, such as the motor or a motor-and-reducer combination. Some first drivers 125 can use the aforementioned motor, while others can adopt a synchronous shaft structure. The first driving wheel 122 driven by the motor is connected to other first driving wheels 122 through the synchronous shaft, thereby enabling the synchronous rotation of a plurality of first driving wheels 122. A single first driving wheel 122 is configured to drive the plurality of the first driving wheels 122 to rotate, so as to drive a plurality of first driven wheels 123 to rotate, thereby causing a plurality of conveyor belts 124 to rotate synchronously.

In this embodiment, the drive shaft 142 can drive the plurality of the drive wheels 143 to rotate. The third drive assembly 14 can be provided in plurality. The plurality of the third drive assemblys 14 are provided between different wheel seats 121 to form the gaps 120. The wheel seat 121 can be provided in plurality. When it is necessary to move the artificial stone for centering, the second driver 144 is activated to drive the drive shaft 142 to rotate, which in turn drives the plurality of the drive wheels 143 on the drive shaft 142 to rotate. The rotation of the drive wheel 143 causes the artificial stone to move in a direction perpendicular to the conveying direction of the second conveying assembly 12, ultimately causing the artificial stone to abut against the positioning part 15, thereby positioning the artificial stone. For a specific third drive assembly 14, the second driver 144 is the well-known mechanism with the driving-rotation function, such as the motor or the motor-and-reducer combination. For other second drivers 144, a synchronous belt structure can be synchronously connected the drive shafts 142 of a plurality of the centering drive assemblies 14.

In some embodiments, the cooling device 4 includes a cooling placement seat 41, a receiving assembly 42 and an angle adjustment mechanism 43. The placement mechanism 33, the angle adjustment mechanism 43 and the cooling placement seat 41 are sequentially arranged in the conveying direction of the artificial stones. The receiving assembly 42 includes a fourth drive assembly 421, a first gripper 422 and a fifth drive assembly 423. An output end of the fourth drive assembly 421 is connected to the first gripper 422, and the fourth drive assembly 421 is configured to drive the first gripper 422 to move up and down. An output end of the fifth drive assembly 423 is connected to the fourth drive assembly 421, and the fifth drive assembly 423 is configured to drive the fourth drive assembly 421 to move horizontally, so as to drive the first gripper 422 to move horizontally among the conveying end of the placement mechanism 33, the angle adjustment mechanism 43 and the cooling placement seat 41. The angle adjustment mechanism 43 includes a fixed seat 431, a rotating seat 432 and a third driver 433. The rotating seat 432 is rotatably provided on the fixed seat 431. An output end of the third driver 433 is connected to the rotating seat 432 to drive the rotating seat 432 to rotate with respect to the fixed seat 431.

The receiving assembly 42 is configured to remove the artificial stone from the conveying end of the placement mechanism 33. The removed artificial stone can either be dried or undried. When the artificial stone reaches an outlet of the conveying end of the placement mechanism 33, the receiving assembly 42 is activated. The conveying end of the receiving assembly 42 moves to the position of the artificial stone, receives the artificial stone and transfers it to the cooling placement seat 41. In this embodiment, the artificial stone can be stacked on the cooling placement seat 41 for natural cooling. Alternatively, a cooling device (e.g., a fan) can be provided at the cooling placement seat 41 to facilitate cooling.

In this embodiment, the first gripper 422 is driven to move vertically and horizontally through the coordinated operation of the fourth drive assembly 421 and the fifth drive assembly 423. This allows the first gripper 422 to pass between the cooling placement seat 41 and the conveying end of the placement mechanism 33 during horizontal movement, and grip or release the artificial stone during vertical movement.

The fourth drive assembly 421 can be replaced by a well-known mechanism with a linear lifting function, such as a conventional lifting device. The fifth drive assembly 423 can be replaced by a well-known mechanism with a horizontal movement function, such as the pneumatic cylinder, the hydraulic cylinder or the moving cart. The first gripper 422 can be replaced by a well-known gripping mechanism, such as the robotic arm, the clamp or a suction cup structure.

In this embodiment, the angle adjustment mechanism 43 is preferably arranged between the placement mechanism 33 and the cooling placement seat 41. After the first gripper 422 places the artificial stone onto the rotating seat 432 from the placement mechanism 33, the third driver 433 is activated to drive the rotating seat 432 to rotate, thereby rotating the artificial stone on the rotating seat 432 to a specific angle, such that the artificial stone can be gripped by the first gripper 422 at an optimal angle. This also facilitates stacking the artificial stone onto the cooling placement seat 41 at the optimal angle.

In some embodiments, the inkjet processing system further includes a discharging mechanism 6. The centering device 1, the inkjet printing device 2, the drying device 3, the cooling device 4 and the discharging mechanism 6 are arranged sequentially in the conveying direction of the artificial stones. The discharging mechanism 6 includes a discharger 61, a sixth drive assembly 62, a second gripper 63 and a seventh drive assembly 64. An output end of the sixth drive assembly 62 is connected to the second gripper 63, and the sixth drive assembly 62 is configured to drive the second gripper 63 to move up and down. An output end of the seventh drive assembly 64 is connected to the sixth drive assembly 62, and the seventh drive assembly 64 is configured to drive the sixth drive assembly 62 to move horizontally, so as to drive the second gripper 63 to move horizontally between the cooling placement seat 41 and the discharger 61.

In this embodiment, the second gripper 63 is driven to move vertically and horizontally through the coordinated operation of the sixth drive assembly 62 and the seventh drive assembly 64. This allows the second gripper 63 to pass between the cooling placement seat 41 and the discharger 61 during the horizontal movement, and grip or release the artificial stone during the vertical movement, such that the second gripper 63 can grip the artificial stone at the cooling placement seat 41 and then place it onto the discharger 61.

The sixth drive assembly 62 is a well-known mechanism having the linear lifting function, such as the conventional lifting device. The seventh drive assembly 64 is a well-known mechanism having the horizontal movement function, such as the pneumatic cylinder, the hydraulic cylinder or the moving cart. The second gripper 63 is a well-known mechanism with the gripping function, such as the robotic arm, the clamp or the suction cup structure.

In some embodiments, the picking assembly 335 includes a moving plate 3352, a rotating seat 3353, a fourth driver 3354 and the mold picker 3351. The moving plate 3352 is movably mounted on the lifting frame 332. The rotating seat 3353 is mounted on the moving plate 3352. A first end of the mold picker 3351 is rotatably connected to the rotating seat 3353. The fourth driver 3354 is mounted on the moving plate 3352. An output end of the fourth driver 3354 is connected to the mold picker 3351, and the fourth driver 3354 is configured to drive the mold picker 3351 to rotate around the first end of the mold picker 3351, so as to allow a second end of the mold picker 3351 to swing resettable.

The moving plate 3352 is configured to move along the lifting frame 332, thereby driving the rotating seat 3353 mounted on the moving plate 3352 to move, which in turn drives the mold picker 3351 to move toward or away from the storage station 3202. When the mold picker 3351 moves close to the storage station 3202, the fourth driver 3354 can be activated to drive the mold picker 3351 to rotate around the rotating seat 3353 as a fulcrum, causing the second end of the mold picker 3351 to swing upward, such that the mold picker 3351 comes into contact with the mold and grips it. In an initial state, the fourth driver 3354 is configured to drive the second end of the mold picker 3351 to swing, such that the mold picker 3351 is accommodated below the conveying end of the second drive assembly 334. This configuration minimizes the risk of collision between the mold picker 3351 and other mechanisms during the movement of moving plate 3352, while simultaneously providing a storage function for the mold picker 3351.

The fourth driver 3354 is a well-known mechanism, such as a mechanism capable of driving rotation, for example, the motor or the motor-and-reducer combination. The fourth driver 3354 is connected to the mold picker 3351 to directly drive the mold picker 3351 to rotate. Alternatively, the fourth driver 3354 may be a mechanism capable of driving linear movement, such as the pneumatic cylinder or the hydraulic cylinder. In this embodiment, the fourth driver 3354 drives the second end of the mold picker 3351, thereby enabling the mold picker 3351 to move linearly, which in turn causes the mold picker 3351 to rotate with respect to the rotating seat 3353.

The picking assembly 335 further includes a moving assembly 3355. The moving assembly 3355 includes a rail 33551, a second driving wheel 33552, a second driven wheel 33553, a first synchronous belt 33554 and a first horizontal driver 33555. The rail 33551 is mounted on the lifting frame 332. The second driving wheel 33552 and the second driven wheel 33553 are rotatably mounted on the rail 33551, respectively. The second driving wheel 33552 is synchronously rotatably connected to the second driven wheel 33553 through the first synchronous belt 33554. The first synchronous belt 33554 is configured to extend in a length direction of the rail 33551. The mold picker 3351 is movably arranged on the rail 33551, and is connected to the first synchronous belt 33554. An output end of the first horizontal driver 33555 is connected to the second driving wheel 33552 to drive the second driving wheel 33552 to rotate, thereby causing the mold picker 3351 to move along the rail 33551 through the rotation of the first synchronous belt 33554.

In this embodiment, the first synchronous belt 33554 is preferably used to drive the mold picker 3351 to move. Specifically, the rail 33551 is mounted on the lifting frame 332. The second driving wheel 33552 and the second driven wheel 33553 are respectively mounted on the rail 33551, respectively. The second driving wheel 33552 is synchronously rotatably connected to the second driven wheel 33553 through the first synchronous belt 33554. When the first horizontal driver 33555 is activated, the output end of the first horizontal driver 33555 drives the second driving wheel 33552 to rotate, causing the second driven wheel 33553 to rotate under the synchronous effect of the first synchronous belt 33554, thereby ultimately driving the first synchronous belt 33554 to rotate. The first synchronous belt 33554 is directly or indirectly connected to the mold picker 3351. The rotation of the first synchronous belt 33554 drives the mold picker 3351 to move along the rail 33551, thereby driving the mold picker 3351 to move toward or away from the storage station 3202, either directly or indirectly.

Figure 11:
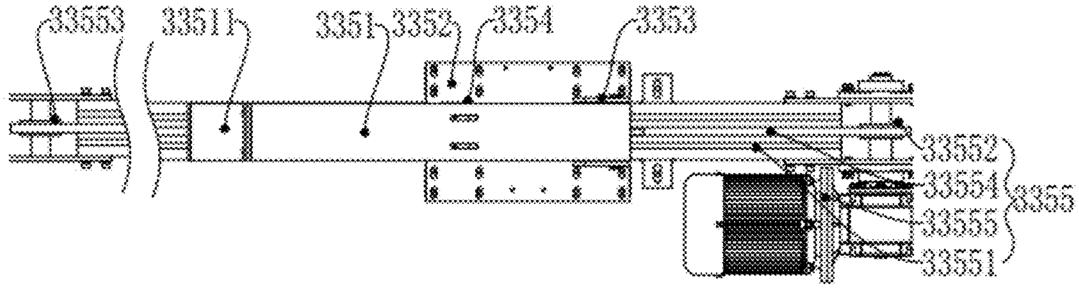
FIG. 11 is a structural diagram of a picking assembly according to an embodiment of the present disclosure.
Figure 12:
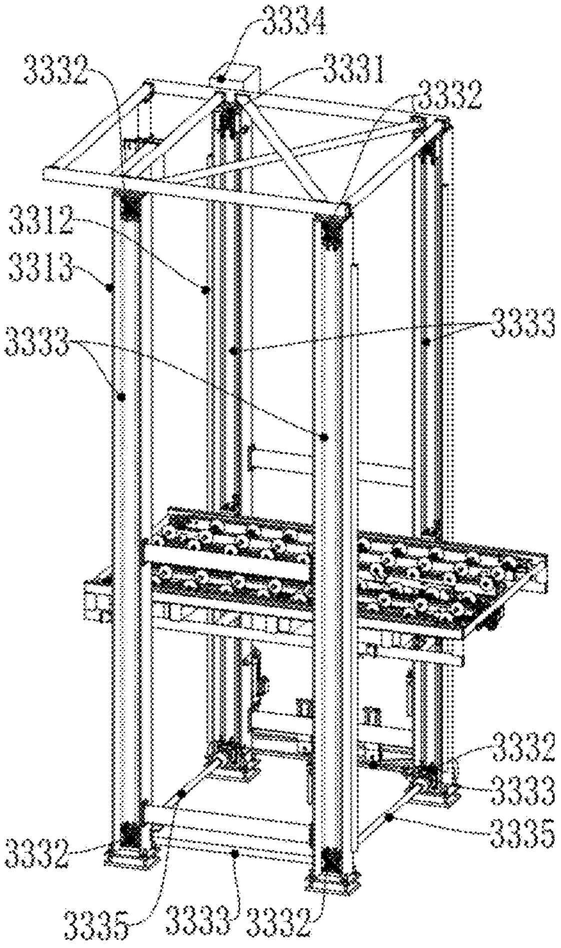
FIG. 12 is a structural diagram of a placement mechanism according to an embodiment of the present disclosure.

The mold picker 3351 is movably arranged on the rail 33551, which means that the mold picker 3351 can be directly or indirectly mounted on the rail 33551. As shown in FIG. 11, the moving plate 3352 is movably mounted on the rail 33551.

Specifically, the first horizontal driver 33555 is a well-known mechanism with a rotational driving function, such as the motor or the motor-and-reducer combination.

The mold picker 3351 is provided with a gripping slot 33511 that opens upward.

Preferably, the mold picker 3351 grips the mold by using the gripping slot 33511. The mold can be formed with a recess or a rod-shaped structure, or can be additionally provided with a mechanism having the recess or the rod-like structure. When the mold picker 3351 approaches the mold, the mold picker 3351 engages with the recess or rod-shaped structure through the gripping slot 33511, such that the mold is driven to move to the position of the second drive assembly 334 during the return stroke of the picking assembly 335. In this way, the structure of the mold picker 3351 is the simplest, and there is no need to install additional mechanisms such as the clamp.

In some embodiments, the first drive assembly 333 includes a driving gear 3331, a plurality of driven gears 3332, a chain 3333, a fifth driver 3334 and a synchronous shaft 3335. The driving gear 3331 and the plurality of driven gears 3332 are rotatably provided on the base frame 331. The chain 3333 is configured to be engaged with the driving gear 3331 and the plurality of driven gears 3332. The lifting frame 332 is connected to the chain 3333. An output end of the fifth driver 3334 is connected to the driving gear 3331, and is configured to drive the driving gear 3331 to rotate. The chain 3333 is configured to be rotated to drive the lifting frame 332 to move up and down on the base frame 331. A first side of the base frame 331 is provided with a drive frame 3312, and a second side of the base frame 331 is provided with a driven frame 3313. The driving gear 3331 is rotatably mounted on the drive frame 3312. The plurality of driven gears 3332 are rotatably mounted on the drive frame 3312 and the driven frame 3313, respectively. The chain 3333 includes a first chain portion arranged at the drive frame 3312, and a second chain portion arranged at the driven frame 3313. The first chain portion is configured to be engaged with the driving gear 3331 and those of the plurality of driven gears 3332 arranged at the drive frame 3312. And the second chain portion is configured to be engaged with those of the plurality of driven gears 3332 at the driven frame 3313. A first end of the synchronous shaft 3335 is connected to the driving gear 3331 or those of the plurality of driven gears 3332 provided on the drive frame 3312, and a second end of the synchronous shaft 3335 is connected to those of the plurality of driven gears 3332 provided on the driven frame 3313, such that the first chain portion and the second chain portion are synchronously and rotatably connected with each other.

The chain 3333 is preferably used to drive the lifting frame 332 to move up and down. Specifically, the lifting frame 332 is liftably mounted on the base frame 331. The driving gear 3331 and the plurality of driven gears 3332 are rotatably provided on the base frame 331. One or more chains 3333 are configured to be engaged with the driving gear 3331 and the plurality of driven gears 3332 arranged at a side of the drive frame 3312. Additionally, one or more chains 3333 are configured to be engaged with the plurality of driven gears 3332 arranged at a side of the driven frame 3313. The driven gears 3332 arranged at the drive frame 3312 and the driven gears 3332 arranged at the driven frame 3313 are connected through the synchronous shaft 3335, or the driving gear 3331 arranged at the drive frame 3312 is connected to the plurality of driven gears 3332 arranged at the driven frame 3313 through the synchronous shaft 3335. When the fifth driver 3334 is activated, the output end of the fifth driver 3334 is configured to drive the driving gear 3331 to rotate, thereby driving those of the plurality of the driven gears 3332 arranged at the drive frame 3312 to rotate, ultimately causing the chain 3333 to rotate. The rotation of the driving gear 3331 and the driven gears 3332 arranged at the drive frame 3312 further drives the driven gears 3332 arranged at the driven frame 3313 to rotate through the synchronous shaft 3335. The first chain portion arranged at the drive frame 3312 and the second chain portion arranged at the driven frame 3313 are directly or indirectly connected to the lifting frame 332. The first chain portion and the second chain portion are configured to be rotated to drive the lifting frame 332 to move up and down along the base frame 331, thereby enabling the lifting frame 332 to move up and down and pass through the plurality of the storage stations 3202.

The fifth driver 3334 is a well-known mechanism capable of driving rotation, such as the motor or the motor-and-reducer combination.

In some embodiments, two opposite sides of the base frame 331 are each provided with the drive frame 3312 and the driven frame 3313. The drive frame 3312 is provided with the driving gear 3331 and the driven gear 3332. The driven frame 3313 is provided with the driven gear 3332. The first chain portion is configured to be engaged with the driving gear 3331 and those of the plurality of driven gears 3332 arranged at the drive frame 3312. The first chain portion is configured to be rotated to drive the driving gear 3331 and those of the plurality of driven gears 3332 to rotate synchronously. The second chain portion is configured to be engaged with those of the plurality of driven gears 3332 arranged at the driven frame 3313. When the driving gear 3331 and the driven gears 3332 arranged at the drive frame 3312 rotate, the driven gears 3332 arranged at both the drive frame 3312 and the driven frame 3313 can be synchronously connected through the synchronous shaft 3335, or the first end of the synchronous shaft 3335 is connected to the driving gear 3331 and the second end of the synchronous shaft 3335 is connected to the driven gears 3332, thereby achieving synchronous rotation of the driving gear 3331 and the driven gears 3332 arranged at both the drive frame 3312 and the driven frame 3313. Consequently, the first chain portion and the second chain portion are configured to drive the lifting frame 332 to move up and down on both sides of the lifting frame 332, improving the lifting stability of the lifting frame 332 while enabling a single driving source to synchronously drive the first chain portion and the second chain portion, thereby simplifying the structure.

The quantity, position and size of the driven gears 3332 can be determined based on actual requirements. The driven gears 3332 primarily function to tension the chain 3333 and serve as a driven component.

The heating box 32 further includes the storage roller 326. The storage roller 326 is arranged in a height direction of the box body 321. The storage station 3202 is formed between two vertically adjacent storage rollers 326.

The storage roller 326 can be mounted in the box body 321. The storage station 3202 is formed between two vertically arranged storage rollers 326 to separate different storage stations 3202. Meanwhile, the storage roller 326 is configured to contact a lower portion of a mold, such that when the mold enters or exits the storage station 3202, the storage roller 326 provides a rolling effect, thereby improving the smoothness of the mold entering and exiting the storage station 3202.

The storage station 3202 is configured to accommodate a mold 34. A side of the mold 34 facing the placement mechanism 33 is provided with a mold gripping portion 341. The mold picker 3351 is movably arranged to grip the mold gripping portion 341.

In some embodiments, a bottom of the mold 34 is provided with the mold gripping portion 341. The mold picker 3351 is configured to grip the mold gripping portion 341 from a bottom surface of the mold 34. In an embodiment, a side of the mold 34 is provided with the mold gripping portion 341, such that the mold picker 3351 only needs to be connected to the mold gripping portion 341 at an entry end of the storage station 3202 without extending into the storage station 3202. This configuration minimizes the movement trajectory of the picking assembly 335, thereby maximizing the mold-picking efficiency.

The second drive assembly 334 includes a second drive seat 3341, a third driving wheel 3342, a third driven wheel 3343, a second synchronous belt 3344, a second horizontal driver 3345, a shaft seat 3346, a transmission shaft 3347 and a transmission wheel 3348.

The second drive seat 3341 is mounted on two sides of the lifting frame 332. The third driving wheel 3342 and the third driven wheel 3343 are rotatably mounted on the second drive seat 3341, respectively. The third driving wheel 3342 is synchronously rotatably connected to the third driven wheel 3343 through the second synchronous belt 3344. The second synchronous belt 3344 is configured to extend in a length direction of the second drive seat 3341. An output end of the second horizontal driver 3345 is connected to the third driving wheel 3342, and the second horizontal driver 3345 is configured to drive the third driving wheel 3342 to rotate, thereby driving the third driven wheel 3343 to rotate.

The shaft seat 3346 is provided at a middle portion of the lifting frame 332. A plurality of transmission shafts 3347 are mounted on the shaft seat 3346. A plurality of transmission wheels 3348 are mounted on the plurality of the transmission shafts 3347.

In this embodiment, the second synchronous belt 3344 is preferably used to drive the mold transmission. Specifically, the second drive seat 3341 is mounted on the two sides of the lifting frame 332. The third driving wheel 3342 and the third driven wheel 3343 are respectively mounted on the second drive seat 3341. The third driving wheel 3342 is synchronously rotatably connected to the third driven wheel 3343 through the second synchronous belt 3344. When the second horizontal driver 3345 is activated, the output end of the second horizontal driver 3345 drives the third driving wheel 3342 to rotate. Under the synchronous effect of the second synchronous belt 3344, the third driven wheel 3343 rotates, causing the second synchronous belt 3344 to rotate. As a result, the mold placed on the surface of the second synchronous belt 3344 reciprocates toward and away from the storage station 3202.

Specifically, the third driving wheel 3342 and the third driven wheel 3343 can be ordinary rotating wheels, and the second synchronous belt 3344 can be an ordinary synchronous belt. In some embodiments, the third driving wheel 3342 and the third driven wheel 3343 may be gears, while the second synchronous belt 3344 may be a synchronous chain that engages with both the third driving wheel 3342 and the third driven wheel 3343.

In an embodiment, the bottom of the mold is directly placed on the second synchronous belt 3344. The second synchronous belt 3344 is configured to drive the mold to move. In an embodiment, the second drive seat 3341 is mounted on the two sides of the lifting frame 332. The shaft seat 3346 is provided at the middle portion of the lifting frame 332. The transmission wheels 3348 are configured to support the bottom portion within two sides of the mold from below. The second synchronous belt 3344 is configured to support the two sides of the mold. The rotation of the second synchronous belt 3344 drives the mold to be conveyed along the lifting frame 332, allowing the mold to move with respect to the transmission wheels 3348. This configuration reduces the pressure exerted on the second synchronous belt 3344, thereby lowering the load of the second synchronous belt 3344.

The picking assembly 335 is configured to move between two adjacent shaft seats 3346. The mold picker 3351 is movably resettable to extend above the transmission wheel 3348.

The picking assembly 335 is located at the middle portion of the lifting frame 332, specifically between the shaft seats 3346, and is configured for gripping the mold through the mold picker 3351. Meanwhile, in one operating state of the mold picker 3351, the mold picker 3351 is in a retracted state above the transmission wheels 3348, preventing it from gripping the mold. When the picking assembly 335 moves to the nearest storage station 3202, the mold picker 3351 extends above the transmission wheels 3348 in another operating state, so as to grip the mold. The picking assembly 335 then moves away from the storage station 3202 to place the mold onto the transmission wheels 3348, after which the mold is conveyed outward by the second synchronous belt 3344.

An embodiment of the present disclosure also provides a method for processing an artificial stone, performing inkjet printing on the artificial stone using the inkjet processing system provided herein.

Although embodiments of the present disclosure have been shown and described in detail above, those of ordinary skill in the art can still make a variety of changes, modifications, substitutions, and variations to these embodiments. It should be understood that those changes, modifications, substitutions, and variations made without departing from the principles and spirit of the present disclosure shall fall within the scope of the present disclosure defined by the appended claims.

What is claimed is:

1. An inkjet processing system for artificial stones, comprising:

a centering device;

an inkjet printing device;

a drying device; and a cooling device;

wherein the centering device, the inkjet printing device, the drying device and the cooling device are arranged sequentially in a conveying direction of the artificial stones;

the inkjet printing device is configured to perform inkjet printing; a first conveying end of the centering device is oriented toward the inkjet printing device, and a conveying direction of the first conveying end of the centering device is perpendicular to a conveying direction of a second conveying end of the centering device;

the drying device comprises a first conveying assembly, a heating box and a placement mechanism;

the heating box is provided with a transition station having two hollow ends; one of the two hollow ends of the transition station is oriented toward the inkjet printing device, and the other of the two hollow ends of the transition station is oriented toward the placement mechanism; a side of the heating box facing toward the placement mechanism is provided with a storage station; the first conveying assembly is provided at the transition station; an inlet of a conveying end of the first conveying assembly is provided adjacent to an outlet of a conveying end of the inkjet printing device;

the placement mechanism comprises a base frame, a lifting frame, a first drive assembly, a second drive assembly and a picking assembly;

the first drive assembly is provided at the base frame; an output end of the first drive assembly is connected to the lifting frame, and configured to drive the lifting frame to move up and down with respect to the base frame, so as to adjust the lifting frame to an outlet of the conveying end of the first conveying assembly, the storage station or an inlet of a conveying end of the cooling device; and the second drive assembly is provided at the lifting frame; a conveying end of the second drive assembly is configured for horizontal conveying in a direction toward the storage station; the picking assembly is provided with a mold picker configured for gripping a mold frame loaded with artificial stones; the mold picker is configured to move in a resettable manner; and the picking assembly is movably mounted on the lifting frame, and is configured to reciprocate between the storage station and the conveying end of the second drive assembly.

2. The inkjet processing system of claim 1, wherein the heating box comprises a box body, a heating air duct assembly and an air guide plate;

the box body is provided with a drying storage chamber and an air-inlet chamber; and a partition plate is provided between the drying storage chamber and the air-inlet chamber to separate the drying storage chamber from the air-inlet chamber;

the heating air duct assembly comprises a heating air-inlet duct and an air heating component;

an output end of the heating air-inlet duct is communicated with a first end of the air-inlet chamber in a length direction of the air-inlet chamber; and an output end of the air-inlet chamber is located at the partition plate;

the air-inlet chamber has a plurality of output ends, and the plurality of output ends of the air-inlet chamber are configured to extend in a length direction of the partition plate, and are communicated with the drying storage chamber; and the air heating component is provided at the heating air-inlet duct for heating; and the air guide plate is provided in the air-inlet chamber; a first end of the air guide plate is located at the first end of the air-inlet chamber in the length direction of the air-inlet chamber, and a second end of the air guide plate is located at a second end of the air-inlet chamber in the length direction of the air-inlet chamber; an air guide passage is formed between the partition plate and the air guide plate; and an inner diameter of the air guide passage is configured to be reduced in a direction away from the heating air-inlet duct.

3. The inkjet processing system of claim 2, wherein at least two sides of the drying storage chamber are each provided with the air-inlet chamber, and the air-inlet chamber is communicated with the heating air-inlet duct;

the air heating component comprises a resistance heating unit and a gas-fired heating unit; and the number of the air-inlet chamber is two; the number of the heating air-inlet duct is two; two air-inlet chambers are in one-to-one correspondence with two heating air-inlet ducts; one of the two heating air-inlet ducts is provided with the resistance heating unit, and the other of the two heating air-inlet ducts is provided with the gas-fired heating unit.

4. The inkjet processing system of claim 1, further comprising:

a pretreatment device;

wherein the pretreatment device, the centering device, the inkjet printing device, the drying device and the cooling device are arranged sequentially in the conveying direction of the artificial stones;

the pretreatment device is provided with a pretreatment chamber; and the pretreatment chamber is provided with a pre-heating mechanism and a cleaning mechanism.

5. The inkjet processing system of claim 1, wherein the centering device comprises a centering base, a second conveying assembly, a lifting assembly and a third drive assembly;

the second conveying assembly is provided on the centering base; a conveying end of the second conveying assembly is configured for conveying in a direction toward the inkjet printing device; the second conveying assembly is provided in plurality; and conveying ends of any two adjacent second conveying assemblies are configured to be spaced apart from each other to form a gap;

the lifting assembly and the third drive assembly are provided within the gap;

a conveying end of the lifting assembly is connected to the third drive assembly;

and the lifting assembly is configured to drive the third drive assembly to ascend to a position above or below the conveying end of the second conveying assembly;

a conveying end of the third drive assembly is configured to extend laterally, and is perpendicular to the conveying end of the second conveying assembly; and the centering base is provided with a positioning part, and the positioning part is arranged at an outlet of the conveying end of the third drive assembly.

6. The inkjet processing line of claim 1, wherein the cooling device comprises a cooling placement seat, a receiving assembly and an angle adjustment mechanism;

the placement mechanism, the angle adjustment mechanism and the cooling placement seat are sequentially arranged in the conveying direction of the artificial stones;

the receiving assembly comprises a third drive assembly, a first gripper and a fourth drive assembly;

an output end of the third drive assembly is connected to the first gripper, and the third drive assembly is configured to drive the first gripper to move up and down;

an output end of the fourth drive assembly is connected to the third drive assembly, and the fourth drive assembly is configured to drive the third drive assembly to move horizontally, so as to drive the first gripper to move horizontally among a conveying end of the placement mechanism, the angle adjustment mechanism and the cooling placement seat;

the angle adjustment mechanism comprises a fixed seat, a rotating seat and a driver; and the rotating seat is rotatably provided on the fixed seat; and an output end of the driver is connected to the rotating seat to drive the rotating seat to rotate with respect to the fixed seat.

7. The inkjet processing system of claim 6, further comprising:

a discharging mechanism;

wherein the centering device, the inkjet printing device, the drying device, the cooling device and the discharging mechanism are arranged sequentially in the conveying direction of the artificial stones;

the discharging mechanism comprises a discharger, a fifth drive assembly, a second gripper and a sixth drive assembly;

an output end of the fifth drive assembly is connected to the second gripper, and the fifth drive assembly is configured to drive the second gripper to move up and down; and an output end of the sixth drive assembly is connected to the fifth drive assembly, and the sixth drive assembly is configured to drive the fifth drive assembly to move horizontally, so as to drive the second gripper to move horizontally between the cooling placement seat and the discharger.

8. The inkjet processing system of claim 1, wherein the picking assembly comprises a moving plate, a rotating seat, a driver and the mold picker;

the moving plate is movably mounted on the lifting frame; the rotating seat is mounted on the moving plate; a first end of the mold picker is rotatably connected to the rotating seat; the driver is mounted on the moving plate; and an output end of the driver is connected to the mold picker, and the driver is configured to drive the mold picker to rotate around the first end of the mold picker, so as to allow a second end of the mold picker to swing resetably.

9. The inkjet processing system of claim 1, wherein the first drive assembly comprises a driving gear, a plurality of driven gears, a chain, a driver and a synchronous shaft;

the driving gear and the plurality of driven gears are rotatably provided on the base frame; the chain is configured to be engaged with the driving gear and the plurality of driven gears; and the lifting frame is connected to the chain;

an output end of the driver is connected to the driving gear, and is configured to drive the driving gear to rotate; and the chain is configured to be rotated to drive the lifting frame to move up and down on the base frame;

a first side of the base frame is provided with a drive frame, and a second side of the base frame is provided with a driven frame; the driving gear is rotatably mounted on the drive frame; and the plurality of driven gears are rotatably mounted on the drive frame and the driven frame, respectively;

the chain comprises a first chain portion arranged at the drive frame, and a second chain portion arranged at the driven frame; the first chain portion is configured to be engaged with the driving gear and those of the plurality of driven gears arranged at the drive frame; and the second chain portion is configured to be engaged with those of the plurality of driven gears at the driven frame; and a first end of the synchronous shaft is connected to the driving gear or those of the plurality of driven gears provided on the drive frame, and a second end of the synchronous shaft is connected to those of the plurality of driven gears provided on the driven frame, such that the first chain portion and the second chain portion are synchronously and rotatably connected with each other.

10. A use of the inkjet processing system of claim 1 for inkjet printing of an artificial stone.

* * * * *